US006529866B1

(12) United States Patent
Cope et al.

(10) Patent No.: US 6,529,866 B1
(45) Date of Patent: Mar. 4, 2003

(54) SPEECH RECOGNITION SYSTEM AND ASSOCIATED METHODS

(75) Inventors: R. Bradley Cope, Oviedo, FL (US); Stephen G. Boemler, Orlando, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/450,641

(22) Filed: Nov. 24, 1999

(51) Int. Cl.[7] .......................... G10L 15/20; G10L 21/02

(52) U.S. Cl. ........................ 704/205; 704/226; 704/233; 381/94.3

(58) Field of Search ............................. 704/200.1, 205, 704/206, 226, 231, 233, 234, 235, 238, 255, 256, 203, 209; 381/94.1, 94.2, 94.3

(56) References Cited

U.S. PATENT DOCUMENTS

| | | | | | |
|---|---|---|---|---|---|
| 4,310,721 | A | * | 1/1982 | Manley et al. | 375/222 |
| 4,980,917 | A | * | 12/1990 | Hutchins | 704/203 |
| 5,267,345 | A | * | 11/1993 | Brown et al. | 704/255 |
| 5,479,560 | A | * | 12/1995 | Mekata | 704/209 |
| 5,684,925 | A | * | 11/1997 | Morin et al. | 704/254 |
| 5,937,384 | A | * | 8/1999 | Huang et al. | 704/256 |
| 6,029,124 | A | * | 2/2000 | Gillick et al. | 704/231 |
| 6,098,040 | A | * | 8/2000 | Petroni et al. | 704/234 |
| 6,230,129 | B1 | * | 5/2001 | Morin et al. | 704/254 |

OTHER PUBLICATIONS

Gopalakrishnan et al., "Decoder selection based on cross–entropies," ICASSP International Conference on Acoustics, Speech, and Signal Processing, Apr. 1988, vol. 1, pp. 20 to 23.*

Afify et al., Minimum cross–entropy adaptation of hidden Markov models, IEEE International Conference on Acoustics, Speech and Signal Processing, May 1998, vol. 1, pp. 73 to 76.*

* cited by examiner

*Primary Examiner*—Marsha D. Banks-Harold
*Assistant Examiner*—Martin Lerner
(74) *Attorney, Agent, or Firm*—Robert W. Adams

(57) ABSTRACT

A method and system for converting a sound signal containing a speech component and a noise component into recognizable language are disclosed, wherein the sound signal is transformed from a time domain into a frequency domain. Next the transformed signal is compared with a set of models of all possible sound signals to find a closest-matching known sound signal. A filter is then applied to the transformed signal. Here the filter corresponds to the model of the closest-matching known sound signal. Next a determination is made of an identity of the speech by searching a set of control data models to match a data model with the filtered transformed signal. Finally, a text stream representative of the determination is output, which enables a user not only to hear what may be a noisy voice message, but also to read the filtered message in some form, such as printed text or on a display screen.

1 Claim, 2 Drawing Sheets

SPEECH RECOGNITION SYSTEM AND ASSOCIATED METHODS

BACKGROUND OF THE INVENTION

1. Field of the Invention

The present invention relates to speech recognition systems and, more particularly, to such systems employing a frequency domain filter.

2. Description of Related Art

The recognition of speech is a subset of the general problem of signal processing, in which a pervasive problem is the reduction of noise elements. Although noise cannot be eliminated entirely, it is usually considered sufficient to reduce noise levels to a point at which the embedded signal is discernable to an acceptable probability.

Prior to advances in computing power, speech recognition had been aided by physical filters comprising electrical/electronic circuit elements. Concomitant with developments in CPU power and memory size, software-based speech recognition models have been created. A continuing difficulty, however, has been the creation of such models that can operate in or close to real time and preserve recognition accuracy.

At present the accuracy of commercially available speech-to-text systems is not considered satisfactory by many, even after having been trained by a sole user and when used in substantially noise-free environments. Therefore, it is evident that those operating in high-noise environments in which speech recognition accuracy is of vital importance face a particularly onerous communications challenge. Such environments may include, for example, aircraft cockpits, naval vessels, high-noise manufacturing and construction sites, and military operations sites, to name but a few. Decisions are made in these environments can literally be in the "life or death" category, and thus recognition accuracy is paramount.

As is discussed in a PhD thesis of M. K. Ravishankar (Carnegie Mellon University, 1996), the disclosure of which is incorporated herein by reference, one of the tools of speech recognition technology comprises the "hidden Markov model" (HMM). The HMM is used in Carnegie Mellon's Sphinx-II system, a statistical modeling package.

The commonly accepted unit of speech is the phoneme, of which there are approximately 50 in spoken English. However, as phonemes do not exist in isolation in actual speech, this characterization has been refined to take into account the influence of preceding and succeeding phonemes, which cubes the recognition problem to determining one in $50^3$ triphones. Each of these is modeled by a 5-state HMM in the Sphinx-II system, yielding a total of approximately 375,000 states.

In addition to recognizing a sequence of phonemes, which can be approached as a statistical problem, an interpretation of that sequence must also be made. This interpretation comprises searching for the most likely sequence of words given the input speech. One of the methods known in the art (Ravishankar, 1996) is Viterbi decoding using a beam search, a dynamic programming algorithm that searches the state space for the most likely state sequence that accounts for the input speech. The state space is constructed by creating word HMM models from the constituent phoneme or triphone HMM models, and the beam search is applied to limit the resulting large state space by eliminating less likely states. The Viterbi method is a time-synchronous search that processes the input speech one frame at a time and at a particular rate, typically 100 frames/sec.

The models that have been presented thus far, however, still yield computationally unwieldy techniques that cannot operate accurately in or close to real time in noisy environments.

SUMMARY OF THE INVENTION

It is therefore an object of the present invention to provide an improved speech recognition system that adaptively filters out unwanted noise.

It is an additional object to provide such a system that outputs a textual interpretation of the filtered audio signal.

It is a further object to provide a method for recognizing speech in a noisy environment.

It is another object to provide such a method of building a set of software-based model filters for use in speech recognition.

An additional object is to provide a system and method for generating frequency-domain filters for use in signal processing applications.

A further object is to provide a text representation of a stream of sound containing speech and noise.

These objects and others are attained by the present invention, an improved speech recognition system and associated methods. One aspect of the invention is a method and system for converting a sound signal containing a speech component and a noise component into recognizable language. The method comprises the steps of transforming the sound signal from a time domain into a frequency domain. Next the transformed signal is compared with a set of models of all possible sound signals to find a closest-matching known sound signal.

A filter is then applied to the transformed signal. Here the filter corresponds to the model of the closest-matching known sound signal. Next a determination is made of an identity of the speech by searching a set of control data models to match a data model with the filtered transformed signal. Finally, a text stream representative of the determination is output, which enables a user not only to hear what may be a noisy voice message, but also to read the filtered message in some form, such as printed text or on a display screen.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Figure 1:
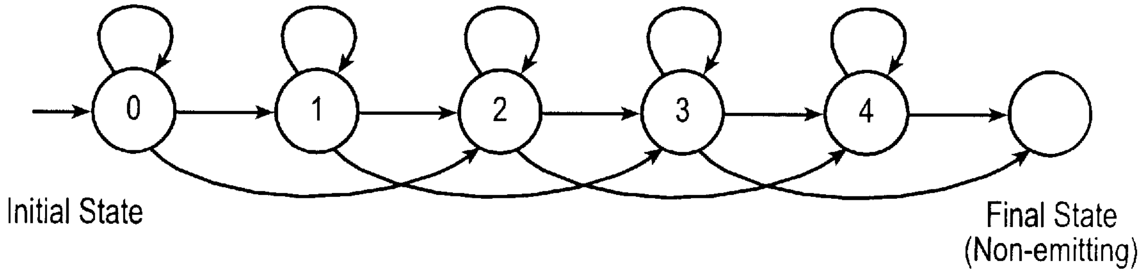
(Prior Art) Fig. 1
FIG. 1 (prior art) is a schematic diagram of a 5-state HMM topology model.
Figure 2:
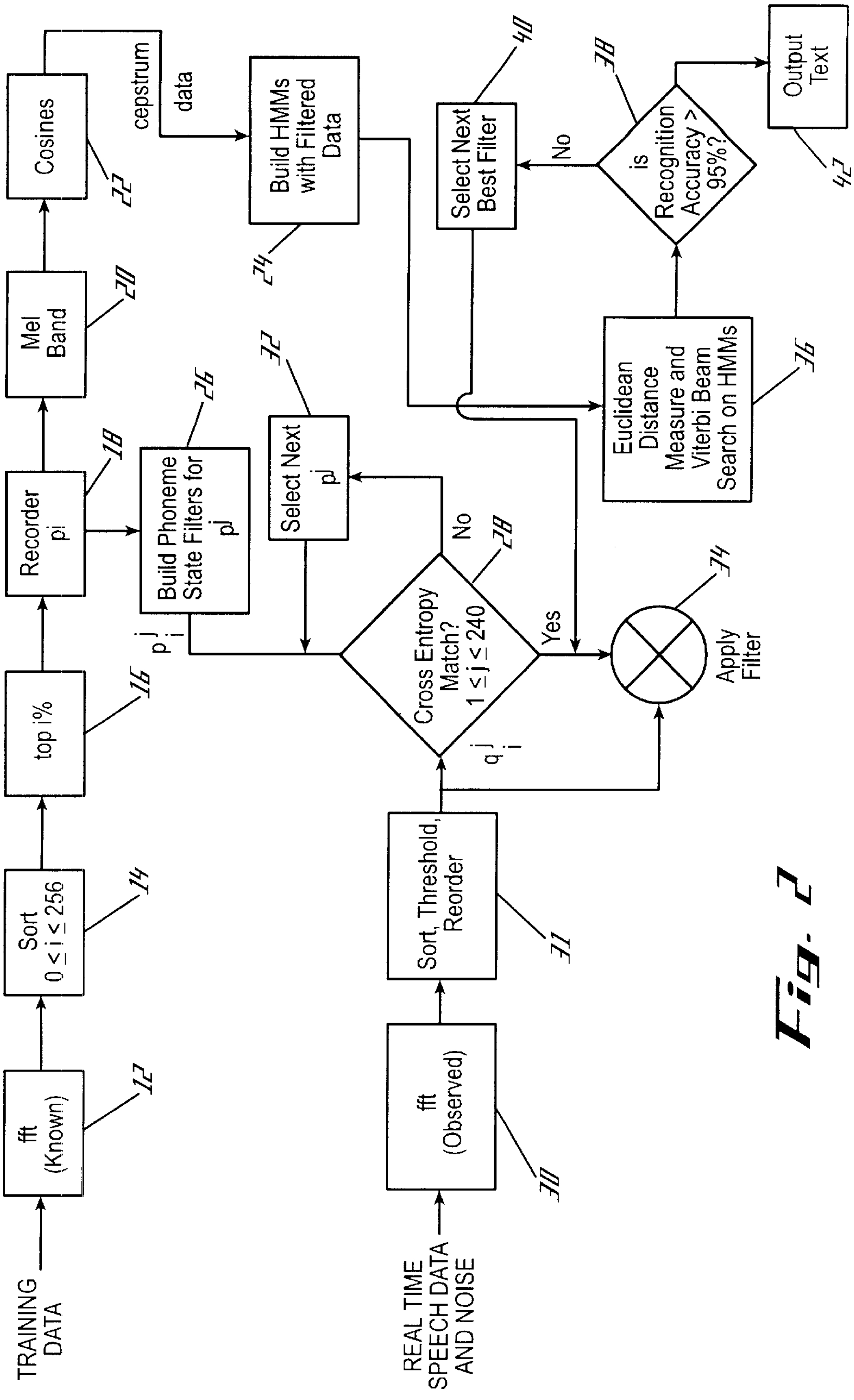
FIG. 2 is a schematic diagram of the speech recognition method of the present invention.

A description of the preferred embodiments of the present invention will now be presented with reference to FIGS. 1 and 2.

Theoretical Basis

A critical hypothesis of the present invention is that the frequency spectrum of a noise-free speech signal contains low-amplitude frequency components that are not required for recognition. With a reduction of the content of the frequency spectrum to only high-amplitude components, and then a building of new models based on this reduced spectrum, a system results that necessarily demonstrates an improved signal-to-noise ratio.

This hypothesis is grounded in the mathematical approximations that are applied when the continuous transformation theory developed by Fourier is adapted for use in a digital signal processing (DSP) application. Fourier transformation is based on a time-varying signal being composed of an infinite number of sine waves. The DSP assumption is that continuous time t can be separated into discrete quantities by sampling every T seconds. The quantification of time permits integrals to be approximated as summations over an infinite number n of samples, and the continuous time domain signal x(t) is replaced by the discrete x(nT).

Digital Fourier transformation (DFT) analyzes the frequency domain f into an infinite summation of harmonic complex sinusoids exp(−jωnT) with amplitudes proportional to x(nT). The $$X(\omega)=\Sigma x(nT)\exp(-j\omega nT) \tag{1}$$

spectrum X(ω) of these sinusoids is a periodic function of the continuous radial frequency ω=2πf :

In currently known speech recognition systems with frequency bandwidths under a predetermined frequency, preferably approximately 8 kHz, the continuous radial frequencies are quantized into 256 frequency bins k of the factor $W_N$, where n=0, 1, . . . , N−1 and k=0, 1, . . . , 255. The spectrum of these frequency bins is now represented as a discrete function of k:

$$X(k)=\sum_{n=0}^{N-1} x(nT)W_N^{nk} \tag{2}$$

To visualize this equation, take, for example, a short 10-msec burst of sound. The frequency domain X(k) may be plotted as a bar graph with 256 bars across the horizontal axis. Each bar represents a quantum k frequency, and the height of each bar represents the total of N amplitudes. Each bar amplitude is the sum of however many signal samples occurred during the t=10 msec signal (where N=t/T), and this sum is weighted by the total number of harmonics (also N) that produced the sound. The weight [given by $W_N$=exp (−j2π/N) raised to the power nk] for each bar is a factor of the phase and is a complex number (with imaginary j), which is commonly referred to as the "twiddle factor."

One aspect of the present invention comprises an extraction of a predetermined number of frequency bins, for example, 56, displaying the largest relative amplitudes, under the premise that the information necessary for speech recognition of a noise-free spectrum is contained within that set of frequency bins. The summation over these 56 terms is normally about 97% of the value of the summation over all 256 terms, which premise is a result of observations on frequency patterns of human utterances, which display energy groupings that were correlated with small numbers of mathematical terms. The average number of terms was found to be approximately 56. Although this number is arbitrary, it was chosen based on empirical tests of various numbers of terms and has resulted in a convenient starting point. This premise then implies that 97% of the energy (amplitude squared) still remains even when 200 low-amplitude terms are neglected.

These terms are identified with respect to their frequency bins in the spectrum, and a pattern is established. If noise is then added to the speech signal, the same 200 presumed-unimportant frequency bins can be neglected irrespective of their new amplitudes. This implies that since about 78% (200/256) of the signal can be eliminated, the added noise will also be eliminated, the added noise will also be reduced by 78% (assuming white noise here—other noise such as background voices will be addressed later).

Such an even reduction of signal and noise frequencies produces an uneven reduction of signal and noise amplitudes. The energy distribution of white noise is uniform over the spectrum so that eliminating 200 frequencies will eliminate 78% of the noise energy but only 3% of the signal energy. This will result in a significant improvement in signal-to-noise ratio, which will improve the speech recognition system's ability to operate in noise.

Noise Filtering

The noise filtering method comprises designing a filter to eliminate white (or other) noise by reprocessing the output data from a FT software routine. These data are then ordered in a frequency series of coefficients X(k), which are in a numerical format (generally floating point, although this is not intended as a limitation). These data are reordered in descending value (amplitude) so that the relatively lowest predetermined number, here 200, amplitudes can be identified and a lowest-amplitude threshold established. The data are then reassembled in the original DFT output form, except that the identified "noise" amplitudes below the threshold are set to zero.

The filtered frequency domain may be thought of as a bar graph comprising 256 frequency bins on the horizontal axis, only 56 of which have any height. A correlated filter is also generated and stored such that for these 56 quantized frequencies the amplitude is set to one (unity gain), and all other frequencies have zero gain. This filter is referred to as a quantized frequency domain filter or briefly as a comb filter. A multiplication of this filter by the input is equivalent to a threshold sort and reorder process.

The digital signal processing is repeated with a predetermined frequency, here 10 msec, which is chosen based on an assumption that the frequencies of human speech can be considered stable for short periods. This is an approximation made for the analysis of a continually changing speech signal.

For the present embodiment, American English is analyzed into 48 liguistically distinct phonemes, which can be modeled as in the Sphinx-II system referred to above by 5 stationary states that are processed every 10 msec and are named senomes. Preferably a unique filtering routine is performed for each senome.

This embodiment comprises a software routine and method that performs the threshold sort/reordering steps. This routine is insertable into an existing software that is adapted to calculate a fast Fourier transform, such as that in the Sphinx-II system.

As this modification of the input speech changes the characteristics of the frequency spectrum, the next step is to construct a new speech model based on the modified characteristics. The exemplary base system, Sphinx-II, comprises a hidden Markov model (HMM).

The variability of human speech is inherent in the hidden Markov model. The model is built from a representative set of human subjects, each producing a set of utterances that will occur in the desired phraseology. Ideally, each possible utterance will have been spoken 7–10 times for each subject. A phonetic recognition system requires 7–10 occurrences of each phoneme in the context in which it will be used. Each phoneme model then represents this variability. Further, as mentioned, the coarticulation necessitates $48^3$ models, one for each triphone.

Speech recognition begins by sampling an analog microphone input with an analog-to-digital (A/D) converter. The sampling rate is 16 kHz, which is more than twice the highest signal frequency, commonly known as the Nyquist frequency, and which prevents aliasing of the sampled signal. The digital audio is then transformed from the time domain to the frequency domain by way of an FFT, one of a class of computationally efficient algorithms that implement the DFT. The transforms are performed every 10 msec on the input, and the resulting frequency spectrum is partitioned using a set of Hamming windows. The bandwidths of these frequency windows are based on the biologically inspired mel scale, which has more resolution at the lower frequencies.

Subsequently, the mel spectrum is multiplied by a series of harmonically related cosine functions, which are then used to characterize the cepstral energy, thus obtaining the mel frequency cepstral coefficients (MFCCs). A 10-msec period is used because of the mechanical operation of the human articulatory organs, especially the glottis, where it is assumed that the time is short enough for the signal to be stationary. Each of the feature vectors in this system represents a 10-msec sound referred to as a senome or a state. Hidden Markov models are developed by the re-estimation of each possible state and establishing a distribution of the MFCC classifications that could occur for each 10-msec period. These models use a feed-forward state transition topology to model the transitions between each subphonetic window. The Viterbi, or Baum-Welch re-estimation algorithms, then compute the statistical likelihood of the model producing a given spoken input or sequence of senome subphonetic observations.

Final state machine HMMs are partitioned phonetically or lexically. When the partitioning is phonetic, as is the case for the present invention, words are constructed by concatenating the phonetic-based models together. Each 10-msec state of the phonetic model has a probability distribution for the feature vectors that can occur for that moment in time. Initially, the probability distribution is established by aligning the acoustic signal with a prescribed phonetic topology for the expected word.

Subsequently, the probability distribution is set by re-estimating a large set of feature vectors specific to the phraseology from a variety of human subjects. The prescribed phonetic topology is defined in a phonetic dictionary. This dictionary can include many variations of a given word, which means there will be a unique set of phonemes for each possible variation.

For the development of this invention, a data set of over 20,000 recorded utterances were used to construct a model. In a particular embodiment, Air Traffic Control commands were collected, the phraseology of which has unique concatenation of words and, therefore, unique effects of coarticulation. The HMM of the present invention comprises 10,000 senomes and 75,000 triphones.

The Holistic System of the Present Invention

The combination of an information threshold on the input signal and a speech recognition that is modeled on the collected data produces a system that inherently rejects uncorrelated information (noise).

Tests were performed and reported previously by the present inventors ("Developing Speech Recognition Models for Use in Training Devices, D. Kotick, Ed., 19th Interservice/Industry Training Systems and Education Conference, 1997, the disclosure of which is incorporated herein by reference) on a proprietary system of Cambridge University, "Entropic." In these tests the input speech signal was saturated with 12 dB of added noise, thus becoming unrecognizable (21% recognition accuracy) on the control system, but when the input data were threshold filtered and correspondingly modified models were incorporated into the system, the accuracy improved to 74%.

Because of software licensing restrictions, the models could not be constructed directly from the FFT output, which is a preferred mode. Therefore, the speech signal was prefiltered on a separate computer in the frequency domain and then converted back to the time domain. This conversion is known as a Fourier synthesis transformation and is preferably to be avoided, since it is believed to produce unwanted effects such as the Gibbs phenomenon.

The source code of the software used in the present disclosure, the Sphinx-II system, has been made accessible by its owner, which has obviated the need for performing a Fourier synthesis transformation.

The system 10 of what is at present believed to be the best mode of the invention is illustrated schematically in FIG. 2. A first aspect of the invention, which is believed to have broad applicability to signal processing in general, comprises a method of generating a set frequency-domain filters from training sound signal data containing a set of desired phonemes.

First the training data are transformed from the time domain into the frequency domain using a method known in the art, the fast Fourier transform (FFT) 12. The transformed data are then sorted 14 into a plurality of energy-level sectors i, here 256 (see Eq. 2). An algorithm sorts the FFT coefficients in order of highest to lowest, and removes 16 all coefficients below a predetermined threshold value, which has been found to comprise the lowest 200 sectors, retaining the top 56 sectors. The remaining coefficients $p_i$ are remapped back to their original order 18 (S. G. Boemler and R. Bradley Cope, "Improved Speech Recognition Using Quantized Frequency Domain Filters," *Proc.* 1998 *I/ITSEC*). As discussed above, the selection of the threshold is based on the number of frequency coefficients that contribute to the total energy of the signal.

Filters are constructed 26 using the resultant FFT data mapped to known phoneme states. The FFT values are averaged and stored for each phoneme state $p^i$. The FFT data for each phoneme state are stored as a digital domain filter $p_i$. The probability density function (PDF) for each FFT phoneme state is computed and stored for use in determining the cross-entropy matching.

The phoneme state alignment is known since the filters have been developed using the phoneme state mapping of the training data. FFT phoneme state filters are applied to the training data using the mapping. Mel banding is performed 20 on the reordered $p_i$, and the mel spectrum is multiplied by a series of harmonically related cosine functions 22, which are then used to characterize the cepstral energy. This yields the mel frequency cepstral coefficients (MFCCs). Hidden Markov models (HMMs) are developed 24 by re-estimating each possible state and establishing a distribution of the MFCC classifications that could occur for each 10-msec period (S. Young, *The HTK Book,* Entropic Research Laboratory, Cambridge University Technical Services, Inc., 1997).

During the recognition process, the normalized PDF is computed for each observed FFT phoneme state $q_i$. The cross-entropy method 28 is then used to determine the best match of the observed PDF to stored PDFs for each FFT in the current phoneme state (C. E. Shannon, "A Mathematical Theory of Communication," *Bell System Technical Journal* 27, 379–423 and 623–56, July and October, 1948). The cross-entropy formula determines the distance between two probability distributions. For an FFT of 256 coefficients, i=0–255. For 48 phonemes and a 5-state Markov model (FIG. 1), the total number of filters is 48×5; so j=1–240, where j is the index to the filter. Similarly, a filter for each subphoneme contributing to the 240 phoneme states could be constructed, $$\text{match}=(\min/j)(-1/2)(\Sigma p_i^j \log_2 q_i+\Sigma q_i \log_2 p_i^j)$$

leading to a much larger set of filters

The probabilities are normalized where $$\Sigma_i p_i=1;\Sigma_i q_i=1$$

The summation is over all i. The range of $\log_2 q_i$ or $\log_2 p_i^j$ is 0 to 8 for i=0–255.

If the match is not achieved, the next $p^i$ is selected 32. Once the best match has been determined, the digital filter, which was mapped to the PDF, is applied 34 to the observed data. Subsequently, recognition is performed using the Euclidean distance measure and Viterbi beam search 36 (A. J. Viterbi, "Error Bounds for Convolution Codes and Asymptotically Optimum Decoding Algorithm," *IEEE Trans. Information Theory* IT-13, 260–69, April 1967) through the 5-state Markov models (Shannon, 1948).

The recognition system uses the stored acoustic data built with the filtered training data. If the recognition accuracy is less than a predetermined level 38, here shown as 95%, a number that is determined from the logarithm of the likelihood, a feedback loop to the application of the filter 34 can be used to apply the next-best quantized frequency-domain filter 40. This loop can iterate through the remaining set of filters until the accuracy is at least 95%. If none of the filters yields the desired recognition accuracy, then recognition has not been achieved.

Once recognition is achieved, a textual version of the recognized speech is output 42.

Frequency-domain filters provide a substantially perfect notch of the spectrum to be removed and can be constructed to match any desired shape where a rolloff can be implemented or substantially completely eliminated. Conversely, amplification can be realized using frequency-domain manipulation.

A holistic process to remove noise from speech signals includes building HMM-based acoustic models 24 using the filters constructed above, as well as to filter observed real-time human voice input data using those filters. First the real-time data are sorted, thresholded, and reordered 31 as in steps 14,16,18. Then the cross-entropy match is performed 28 as outlined above, and the filter is applied 34 to the result. A Euclidean distance measure and Viterbi beam search on the HMMs is performed 36, and again the recognition accuracy is tested 38, and acceptable output displayed or printed 42 to the listener.

It may be appreciated by one skilled in the art that additional embodiments may be contemplated, including the adaptation of the invention using expanded filters and alternate matching techniques.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A method of building a filter for removing noise from a signal comprising the steps of:

- transforming the signal from a time domain to a frequency domain;
- sorting the transformed signal into a plurality of energy-level sectors;
- ordering the sectors by energy level;
- selecting a threshold energy-level value, wherein the threshold energy-level value comprises the fifty-sixth energy-level value, comprising the steps of,
  - summing the energy levels of all sectors to calculate a total energy content of the signal,
  - determining a percentage retention value,
  - sequentially summing energy levels starting from a highest energy level to form a running total until the running total divided by the total energy content reaches the percentage retention value, and
  - assigning a last-added energy level from the sequentially summing step to the threshold value;
- removing signal from all sectors below the threshold energy-level value; and,
- reordering the sectors in frequency order.

* * * * *